United States Patent
Hanlon et al.

(10) Patent No.: US 8,072,172 B2
(45) Date of Patent: Dec. 6, 2011

(54) REDUNDANT ELECTROMECHANICAL ACTUATOR FOR CONTROL SURFACES

(75) Inventors: Casey Hanlon, Queen Creek, AZ (US); David M. Eschborn, Gilbert, AZ (US)

(73) Assignee: Honeywell International Inc., Morristown, NJ (US)

( * ) Notice: Subject to any disclaimer, the term of this patent is extended or adjusted under 35 U.S.C. 154(b) by 492 days.

(21) Appl. No.: 12/362,189

(22) Filed: Jan. 29, 2009

(65) Prior Publication Data

US 2011/0177896 A1 Jul. 21, 2011

Related U.S. Application Data

(60) Provisional application No. 61/138,259, filed on Dec. 17, 2008.

(51) Int. Cl.
*G05B 9/03* (2006.01)
(52) U.S. Cl. ............ 318/564; 318/45; 318/589; 114/23; 114/55.52; 114/144 R; 114/246; 244/184; 244/233; 244/87
(58) Field of Classification Search .................... 318/45, 318/564, 589; 114/23, 55.52, 144 R, 246; 244/184, 233, 87
See application file for complete search history.

(56) References Cited

U.S. PATENT DOCUMENTS

| | | | |
|---|---|---|---|
| 3,661,279 A * | 5/1972 | Macrander | 414/137.7 |
| 3,748,927 A | 7/1973 | Hertzog et al. | |
| 4,227,347 A | 10/1980 | Tam | |
| 4,481,841 A | 11/1984 | Abthoff et al. | |
| 4,533,097 A | 8/1985 | Aldrich | |
| 4,534,235 A | 8/1985 | Mitcham et al. | |
| 4,601,743 A | 7/1986 | Canfield | |
| 4,829,850 A | 5/1989 | Soloy | |
| 5,028,828 A | 7/1991 | Felkai et al. | |
| 5,343,778 A | 9/1994 | Romero et al. | |
| 5,704,440 A | 1/1998 | Urban et al. | |
| 5,865,061 A | 2/1999 | Schubert | |
| 6,435,768 B1 * | 8/2002 | Mansfield | 405/3 |
| 6,484,608 B1 | 11/2002 | Ziavras | |
| 6,588,704 B2 | 7/2003 | Rodrigues | |
| 6,755,375 B2 | 6/2004 | Trikha | |
| 6,860,726 B2 | 3/2005 | Carter, III et al. | |
| 7,377,876 B2 | 5/2008 | Yang | |
| 7,970,520 B2 * | 6/2011 | Gross | 701/50 |
| 2008/0035798 A1 * | 2/2008 | Kothera et al. | 244/212 |
| 2008/0048514 A1 | 2/2008 | Hoffmann et al. | |
| 2008/0258473 A1 | 10/2008 | McMaster | |

* cited by examiner

*Primary Examiner* — Bentsu Ro
*Assistant Examiner* — Erick Glass
(74) *Attorney, Agent, or Firm* — Ingrassia Fisher & Lorenz, P.C.

(57) ABSTRACT

A redundant electromechanical actuator is provided that includes first and second electric motors, a common output shaft, first and second drive cable drums, first and second driven cable drums, a first cable, and a second cable. The first and second electric motors are each adapted to be controllably energized to supply a drive torque. The common output shaft is coupled to receive the drive torque supplied from one or both of the motors. The first and second drive cable drums are coupled to the common output shaft to receive the drive torque from one or both of the motors. The first and second driven cable drums are each configured, upon being driven, to rotate. The first cable is coupled between the first drive cable drum and the first driven cable drum, and the second cable is coupled between the second drive cable drum and the second driven cable drum.

20 Claims, 3 Drawing Sheets

REDUNDANT ELECTROMECHANICAL ACTUATOR FOR CONTROL SURFACES

PRIORITY CLAIMS

This application claims the benefit of U.S. Provisional Application No. 61/138,259 filed Dec. 17, 2008.

TECHNICAL FIELD

The present invention generally relates to electromechanical actuators and, more particularly, to a redundant electromechanical actuator that may be used, for example, to position one or more control surfaces on a submarine.

BACKGROUND

Actuators are used in myriad devices and systems. For example, many vehicles including, for example, aircraft, spacecraft, watercraft, and numerous other terrestrial and non-terrestrial vehicles, include one or more actuators to effect the movement of various control surfaces or components. In many applications such as, for example, aircraft flight surface control systems, missile thrust vector control systems, and submarines, the actuators that are used may be subject to relatively severe environmental conditions, as well as relatively high magnitude shock and vibration. For these reasons, as well as to ensure system availability for mission completion, it is desirable that at least some of the actuators that may be subject to such environmental conditions exhibit suitable redundancy.

For many of the above-mentioned applications, it is becoming increasingly desirable to use electromechanical actuators (EMAs). A typical EMA includes an electric motor that, when properly energized, supplies a torque to a suitable actuation device, which in turn positions a control surface or component. For at least some of the above-mentioned applications relatively small, lightweight actuators are desired. Moreover, relatively quiet actuators, with little or insignificant acoustic signatures may also be needed.

Hence, there is a need for an EMA that exhibits little or insignificant acoustic signature. The present invention addresses at least this need.

BRIEF SUMMARY

In one embodiment, and by way of example only, a redundant electromechanical actuator includes first and second electric motors, a common output shaft, first and second drive cable drums, first and second driven cable drums, a first cable, and a second cable. The first and second electric motors are each adapted to be controllably energized and are each operable, in response thereto, to supply a drive torque. The common output shaft is coupled to receive the drive torque supplied from one or both of the first and second motors. The first and second drive cable drums are coupled to the common output shaft to receive the drive torque supplied from one or both of the first and second motors. The first and second driven cable drums are each configured, upon being driven, to rotate and supply an actuation torque. The first cable is coupled between the first drive cable drum and the first driven cable drum, and the second cable is coupled between the second drive cable drum and the second driven cable drum.

In another exemplary embodiment, a redundant electromechanical actuation control system includes first and second electric motors, a common output shaft, first and second drive cable drums, first and second driven cable drums, a first cable, a second cable, and first and second actuator controllers. The first and second electric motors are each adapted to be controllably energized and are each operable, in response thereto, to supply a drive torque. The common output shaft is coupled to receive the drive torque supplied from one or both of the first and second motors. The first and second drive cable drums are coupled to the common output shaft to receive the drive torque supplied from one or both of the first and second motors. The first and second driven cable drums are each configured, upon being driven, to rotate and supply an actuation torque. The first cable is coupled between the first drive cable drum and the first driven cable drum, and the second cable is coupled between the second drive cable drum and the second driven cable drum. The first and second actuator controllers are coupled to receive position commands and are operable, in response thereto, to controllably energize the first and second electric motors, respectively.

In still another exemplary embodiment, a control surface actuation system includes a control surface and a redundant actuation control system. The control surface is coupled to receive an actuation torque and is operable, upon receipt thereof, to move to a control position. The redundant actuation control system is coupled to the control surface and is operable to supply the actuation torque thereto. The redundant control surface actuation control system includes first and second electric motors, a common output shaft, first and second drive cable drums, first and second driven cable drums, a first cable, a second cable, and first and second controllers. The first and second electric motors are each adapted to be controllably energized and are each operable, in response thereto, to supply a drive torque. The first and second actuator controllers are coupled to receive position commands and are operable, in response thereto, to controllably energize the first and second electric motors, respectively. The common output shaft is coupled to receive the drive torque supplied from one or both of the first and second motors. The first and second drive cable drums are coupled to the common output shaft to receive the drive torque supplied from one or both of the first and second motors. The first and second driven cable drums are each configured, upon being driven, to rotate and supply an actuation torque. The first cable is coupled between the first drive cable drum and the first driven cable drum, and the second cable is coupled between the second drive cable drum and the second driven cable drum.

Other desirable features and characteristics of the redundant actuator and associated systems will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. Furthermore, there is no intention to be bound by any theory presented herein. In this regard, although the actuator is described herein as being implemented within a seagoing underwater vehicle (e.g., a submarine) and for positioning control surfaces, it will be appreciated that it may be implemented in various other vehicles and/or various other environments and/or may be used to position various other components and/or devices.

Figure 1:
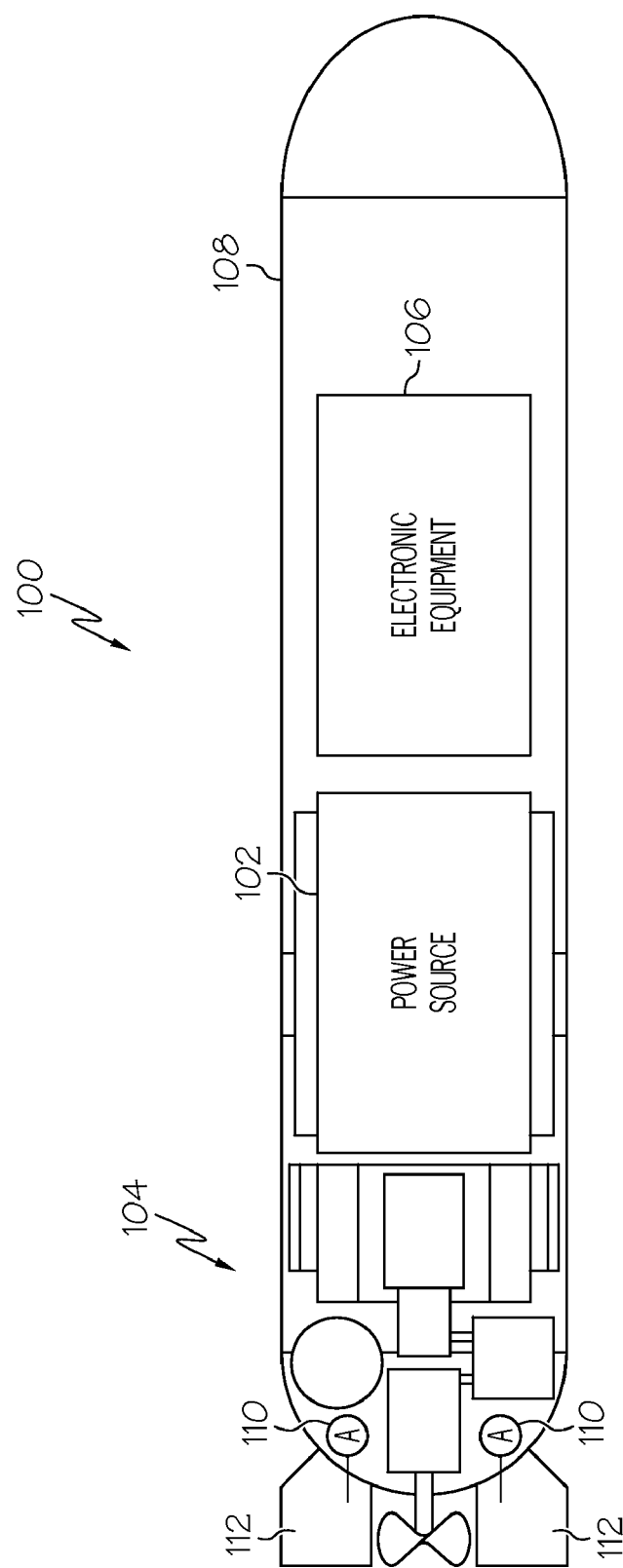
FIG. 1 depicts an exemplary embodiment, in simplified form, of a submarine.

Turning now to FIG. 1, an exemplary embodiment of submarine 100 is depicted in simplified form and includes a power source 102, a power plant 104, and on-board electronic equipment 106, all housed within a pressure hull 108. The power source 102 is used to supply power to the power plant 104. The power source 102 may be any one of numerous types of power sources such as, for example, a nuclear power source, a rechargeable heat source for driving a closed Brayton cycle (CBC), and/or a battery. If a rechargeable heat source is used, it may be any one of numerous types of rechargeable heat sources such as, for example, a porous solid or a molten salt. Similarly, if a battery is used, it may be any one of numerous types of rechargeable batteries such as, for example, a lead-acid battery, a nickel-cadmium battery, or a lithium battery.

The power plant 104 uses the power supplied from the power source 102 to generate propulsion power and electrical power for the submarine 100. Thus, the power plant 104 preferably includes a plurality of turbines, generators, and/or motors to supply the needed propulsion and electrical power. It will be appreciated that the particular number, type, and configuration of equipment and components used to implement the power plant 104 may vary depending on the specific power source 102 that is used.

The on-board electronic equipment 106 may also vary, depending on the purpose and mission of the submarine 100, the configuration of the power source 102, and/or the configuration of the power plant 104. No matter the particular type of electronic equipment 106 that is used, or its particular configuration, the on-board electronic equipment 106 is preferably configured to supply commands to various devices and systems on-board the submarine 100.

Included among the various devices to which the on-board electronic equipment supplies commands are various actuation control systems. The actuation control systems may be used to control the movement of various devices or components on or within the pressure hull 108. For example, as depicted in FIG. 1, various actuators 110 may be coupled to various control surfaces 112 on the pressure hull 108. The control surfaces 112, as is generally known, are used for steering and diving control of the submarine 100. A particular preferred embodiment of an actuation control system 200 associated with one of the actuators 110 is depicted in FIG. 2, and with reference thereto will now be described.

The exemplary actuation control system 200 includes first and second actuator controllers 201 (e.g., 201-1, 201-2) and at least one actuator 110. Preferably, the first and second actuator controllers 202 are substantially identical in configuration and operation. In particular, each is coupled to receive, for example, position commands from the on-board electronic equipment 106 and, in response, to controllably energize the actuator 110. It will be appreciated that the system 200 could be configured such that both controllers 201 are normally active and simultaneously energize the actuator 110, or such that only one of the controllers 201-1 (201-2) is normally active to energize the actuator 110 while the other 201-2 (201-1) is normally inactive and acts as a backup in the unlikely event the normally active controller 201-1 (201-2) becomes inoperable or otherwise unavailable. It will be appreciated that for either configuration, only one of the controllers 201 is needed to control the actuator 110 and effect movement of the associated control surface 112 (or other component).

No matter the particular operational paradigm that the control system 200 implements, each controller 201 is configured to implement a suitable control law to controllably energize the actuator 110. In this regard, and as FIG. 2 further depicts, each controller 201 is also coupled to receive position feedback signals. The first controller 201-1 receives independent first position feedback signals from a first pair of independent position sensors 207-1, 207-2, and the second controller 201-2 receives independent second position feedback signals from a second pair of independent position sensors 209-1, 209-2. Each of the first pair of independent position sensors 207-1, 207-2 is coupled to, and independently senses the position of, the associated control surface 112, and supplies an independent first position feedback signal to the first actuator controller 201-1. Similarly, each of the second pair of independent position sensors 209-1, 209-2 is coupled to, and independently senses the position of, the associated control surface 112, and supplies an independent second position feedback signal to the second actuator controller 201-2. It will be appreciated that the use of quad-redundant position sensing (e.g., 4 position sensors) is merely exemplary, and that dual redundant position sensing could also be used. It will additionally be appreciated that the position sensors 207, 209 could be implemented using any one of numerous suitable position sensors now known or developed in the future.

Figure 2:
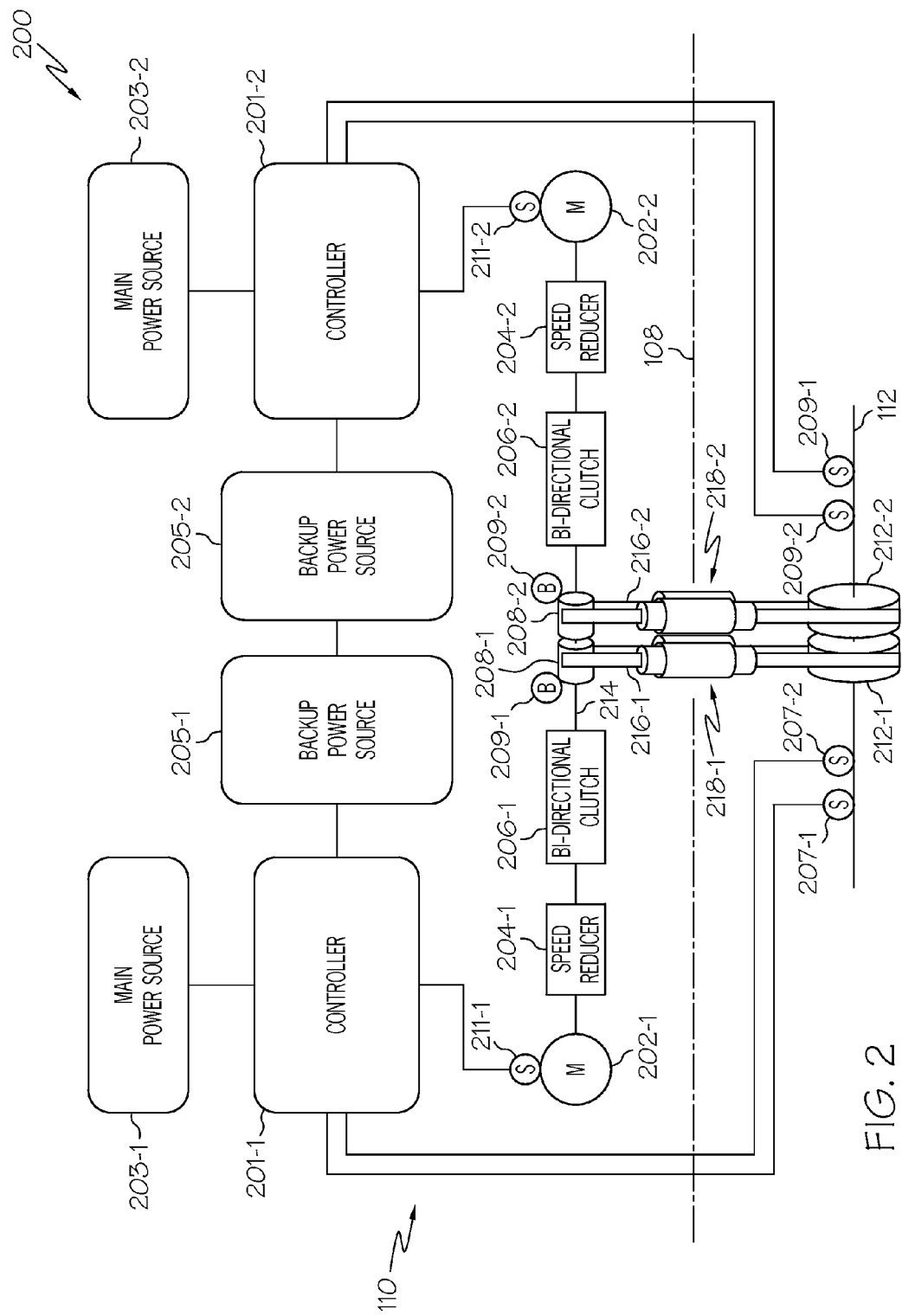
FIG. 2 depicts an embodiment of an actuator that may be used to controllably move one or more control surfaces of the submarine depicted in FIG. 1.

As FIG. 2 also depicts, each controller 201 is coupled to receive electric power from two independent power sources. In particular, the first controller 201-1 is coupled to a first main power source 203-1 and a first backup power source 205-1, and the second controller 201-2 is coupled to a second main power source 203-2 and a second backup power source 205-2. As the nomenclatures connote, the first and second main power supplies 203 are normally used to supply electrical power to the controllers 201, and the backup power sources 205 are used to supply electrical power to the controllers 201 in the unlikely event that the associated main power supply 203 becomes inoperable or otherwise unavailable. The main 203 and backup 205 power sources may be variously configured and implemented. In the depicted embodiment, the main power sources are preferably implemented using existing independent power sources within the submarine 100, and the backup power sources 205 are implemented using various energy storage devices. Some non-limiting examples of suitable energy storage devices include flywheel generators, batteries, capacitors, and battery/capacitor hybrid devices.

No matter the particular configuration and implementation of the power sources 203, 205, the controllers 201, as noted above, are each configured to controllably energize the actuator 110, to thereby controllably move the associated control surface 112 to the commanded position. The actuator 110 is a redundant electromechanical actuator (EMA) 110 that includes at least first and second motors 202 (e.g., 202-1, 202-2), first and second speed reducers 204 (e.g., 204-1, 204-2), first and second bi-directional overrunning clutches 206 (e.g., 206-1, 206-2), and first and second drive cable drums 208 (e.g., 208-1, 208-2). The motors 202 are preferably implemented using multi-phase permanent magnet brushless AC machines. Thus, each motor includes a rotor position sensor 211 (e.g., 211-1, 211-2) that senses the rotational position of the motor rotor and supplies a rotational position signal representative thereof to the associated controller 201. It will be appreciated, however, that various other types of motors may be used. For example, various other types of AC and DC motors could be used. Moreover, the configurations of the motors 202 may vary. For example, the motors 202 could be axial gap motors or radial gap motors, and the motors 202 could be flooded or non-flooded. If implemented as flooded motors, the motors 202 could be disposed outside of the pressure hull 108, if needed or desired. No matter the particular type, configuration, and location of the motors 202, each motor 202, when controllably energized, supplies a drive torque.

The speed reducers 204 are each coupled to receive the drive torque supplied by one of the motors 202. Although various speed reducer devices could be used, in the depicted embodiment each is implemented using traction drives, as these are relatively quiet devices. It will additionally be appreciated that, at least in some embodiments, the actuator 110 could be implemented without the speed reducers 204. No matter the specific implementation, however, the speed reducers 204, if included, are each configured to implement speed reduction and supply a reduced-speed drive torque to one of the bidirectional overrunning clutches 206.

The bidirectional overrunning clutches 206 are each coupled to receive the reduced-speed drive torque from one of the speed reducers 204. The use of bidirectional overrunning clutches 206 eliminates the need to design for a highly unlikely, though postulated, common-mode failure that a differential, if coupled the motor outputs, could introduce. The bidirectional overrunning clutches 206, in addition to being coupled to individual ones of the speed reducers 204, are both coupled to a common output shaft 214, which is the only prime reliable component in the actuator 110. That is, the common output shaft 214 is the only non-redundant component associated with the actuator 110.

The drive cable drums 208 are also coupled to the common output shaft 214 and receive the motor drive torque from one or both of the motors 202. The drive cable drums 208 are in turn coupled to driven cable drums 212 (e.g., 212-1, 212-2) via suitable cables 216 (e.g., 216-1, 216-2). Thus, rotation of the drive cable drums 208 results in concomitant rotation of the driven cable drums 212. The driven cable drums 212 are coupled to an associated control surface 112 such that rotation of the driven cable drums 212 moves control surface 112. In the depicted embodiment, each of the cables 216 extend through individual hull penetrations 218 (e.g., 218-1, 218-2). It will be appreciated that the fixed geometry of the cables 216 allows the use of relatively simplified hull penetrations 218, such as linear piston hull penetrations. The depicted actuation control system may also include brakes 209 (e.g., 209-1, 209-2). In the context of a submarine application, for example, the brakes 209 are preferably included to enable dry dock maintenance operations.

The depicted actuation control system 200 does not include a manual drive system because the architecture is fully redundant up to the output shaft 214. However, it will be appreciated that a suitably configured manual drive may be included, if needed or desired. The depicted actuator 110, with the exception of the driven cable drums 212, is disposed within the pressure hull 108. In other embodiments, however, various other portions of the actuator 110 could also be disposed outside of the pressure hull 108. It some embodiments, as was noted above, the motors 202 may be implemented as flooded motors. In such embodiments, each of the motors 202 preferably shares lubricant with its associated speed reducer 204 and bidirectional overrunning clutch 206. It will be appreciated that lubricant pressure, in the flooded motor embodiments, is preferably maintained at, or slightly higher than, the external environment pressure at all times. It will additionally be appreciated that numerous and varied means could be implemented to accomplish this function. For example, an oil-filled bellows that senses external pressure and automatically increases the oil pressure, as needed, could be used.

Figure 3:
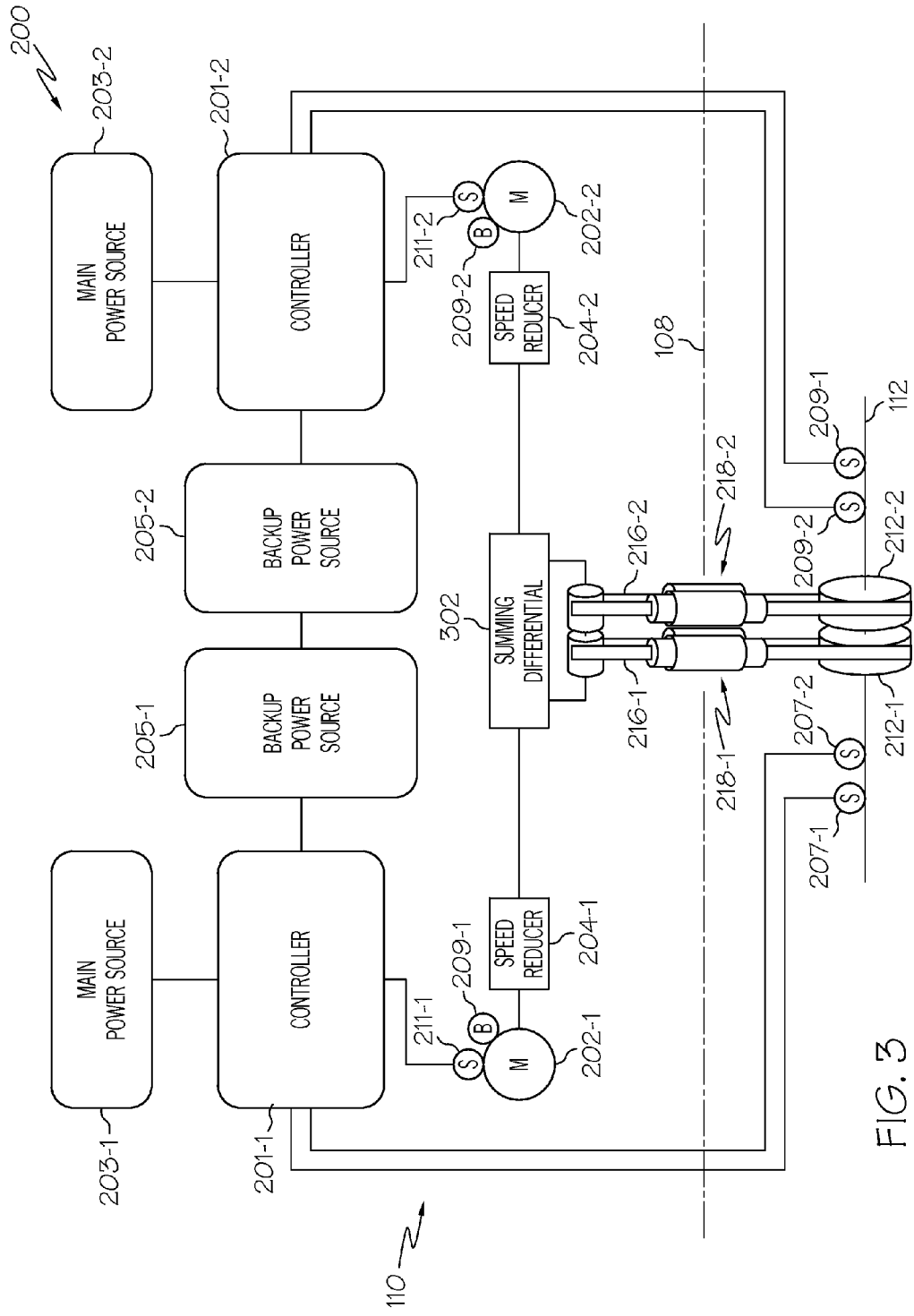
FIG. 3 depicts an alternate embodiment of an actuator that may be used to controllably move one or more control surfaces of the submarine depicted in FIG. 1.

In an alternate embodiment, which is depicted in FIG. 3, the actuation control system 200 is configured substantially identical to the one depicted in FIG. 2. However, the alternate embodiment includes a summing differential 302 rather than the bi-directional overrunning clutches 206, and the brakes 209 are used to lock and unlock the motors 202.

The depicted actuator 110 provides several distinct advantages over various known redundant actuators. For example, the use of cable drum drive technology provides a relatively constant mechanical advantage. As a result, the torque requirements of the actuator 110 may be reduced, since full actuator torque may be available regardless of control surface angular position. The dual motors 202 driving through the bidirectional overrunning clutches 206 provides a relatively simple and less costly configuration by eliminating the need for a differential. This also provides the possibility of sizing each motor 202 for half of the design peak load due to the torque sum nature of the bi-directional over running clutches 206. It will be appreciated that for embodiments that are implemented using this half-sized motor approach, both motors would likely be simultaneously energized during normal operation. In the highly unlikely event that one of the motors 202 were to become inoperable or otherwise unavailable, the actuator would continue to operate, but the torque capability of the actuator 110, and thus the resultant movement rate, would be reduced by one-half.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

The invention claimed is:

1. A redundant electromechanical actuator, comprising:
    first and second electric motors, each motor adapted to be controllably energized and operable, in response thereto, to supply a drive torque;
    a common output shaft coupled to receive the drive torque supplied from one or both of the first and second motors;
    first and second drive cable drums coupled to the common output shaft to receive the drive torque supplied from one or both of the first and second motors;
    first and second driven cable drums, each driven cable drum configured, upon being driven, to rotate and supply an actuation torque;
    a first cable coupled between the first drive cable drum and the first driven cable drum; and
    a second cable coupled between the second drive cable drum and the second driven cable drum.

2. The actuator of claim 1, further comprising:
    a first bidirectional overrunning clutch coupled between the first motor and the common output shaft; and
    a second bidirectional overrunning clutch coupled between the second motor and the common output shaft.

3. The actuator of claim 2, further comprising:
    a first speed reducer coupled between the first bidirectional overrunning clutch and the first motor; and
    a second speed reducer coupled between the second bidirectional motor and the second motor.

4. The actuator of claim 3, wherein the first and second speed reducers each comprise traction drives.

5. The actuator of claim 1, further comprising:
first and second brakes configured to selectively engage the first and second drive cable drums.

6. A redundant electromechanical actuation control system, comprising:
first and second electric motors, each motor adapted to be controllably energized and operable, in response thereto, to supply a drive torque;
a common output shaft coupled to receive the drive torque supplied from one or both of the first and second motors;
first and second drive cable drums coupled to the common output shaft to receive the drive torque supplied from one or both of the first and second motors;
first and second driven cable drums, each driven cable drum configured, upon being driven, to rotate and supply an actuation torque;
a first cable coupled between the first drive cable drum and the first driven cable drum;
a second cable coupled between the second drive cable drum and the second driven cable drum; and
first and second actuator controllers, the first and second actuator controllers coupled to receive position commands and operable, in response thereto, to controllably energize the first and second electric motors, respectively.

7. The system of claim 6, further comprising:
a first pair of independent position sensors, each of the first pair of independent position sensors adapted to independently sense a position of an actuated component and supply independent first position feedback signals to the first actuator controller; and
a second pair of independent position sensors, each of the second pair of independent position sensors adapted to independently sense a position of an actuated component and supply independent second position feedback signals to the second actuator controller.

8. The system of claim 6, further comprising:
first and second main power sources in operable communication with the first and second controllers, respectively; and
first and second backup power sources in operable communication with the first and second controllers, respectively, and configured to store energy for selective supply of electrical power to the first and second controllers, respectively.

9. The actuator of claim 6, further comprising:
a first bidirectional overrunning clutch coupled between the first motor and the common output shaft; and
a second bidirectional overrunning clutch coupled between the second motor and the common output shaft.

10. The actuator of claim 9, further comprising:
a first speed reducer coupled between the first bidirectional overrunning clutch and the first motor; and
a second speed reducer coupled between the second bidirectional motor and the second motor.

11. The actuator of claim 10, wherein the first and second speed reducers each comprise traction drives.

12. The actuator of claim 11, further comprising:
first and second brakes configured to selectively engage the first and second drive cable drums.

13. The actuator of claim 6, further comprising:
a summing differential coupled to the first and second motors and to the first and second drive cable drums; and
first and second brakes configured to selectively engage the first and second motors, respectively.

14. A control surface actuation system, comprising:
a control surface coupled to receive an actuation torque and operable, upon receipt thereof, to move to a control position; and
a redundant actuation control system coupled to the control surface and operable to supply the actuation torque thereto, the redundant control surface actuation control system comprising:
first and second electric motors, each motor adapted to be controllably energized and operable, in response thereto, to supply a drive torque;
first and second actuator controllers, the first and second actuator controllers coupled to receive position commands and operable, in response thereto, to controllably energize the first and second electric motors, respectively;
a common output shaft coupled to receive the drive torque supplied from one or both of the first and second motors;
first and second drive cable drums coupled to the common output shaft to receive the drive torque supplied from one or both of the first and second motors;
first and second driven cable drums, each driven cable drum coupled to the control surface and configured, upon being driven, to rotate and supply the actuation torque;
a first cable coupled between the first drive cable drum and the first driven cable drum; and
a second cable coupled between the second drive cable drum and the second driven cable drum.

15. The system of claim 14, further comprising:
a first pair of independent position sensors, each of the first pair of independent position sensors adapted to independently sense a position of an actuated component and supply independent first position feedback signals to the first actuator controller; and
a second pair of independent position sensors, each of the second pair of independent position sensors adapted to independently sense a position of an actuated component and supply independent second position feedback signals to the second actuator controller.

16. The system of claim 14, further comprising:
first and second main power sources in operable communication with the first and second controllers, respectively; and
first and second backup power sources in operable communication with the first and second controllers, respectively, and configured to store energy for selective supply of electrical power to the first and second controllers, respectively.

17. The actuator of claim 14, further comprising:
a first bidirectional overrunning clutch coupled between the first motor and the common output shaft;
a second bidirectional overrunning clutch coupled between the second motor and the common output shaft; and
first and second brakes configured to selectively engage the first and second drive cable drums.

18. The actuator of claim 17, further comprising:
a first speed reducer coupled between the first bidirectional overrunning clutch and the first motor; and
a second speed reducer coupled between the second bidirectional motor and the second motor.

19. The actuator of claim 17, wherein the first and second speed reducers each comprise traction drives.

20. The actuator of claim 14, further comprising:
a summing differential coupled to the first and second motors and to the first and second drive cable drums; and
first and second brakes configured to selectively engage the first and second motors, respectively.

* * * * *